INVENTOR.
EARL P. SHAPLAND, JR.

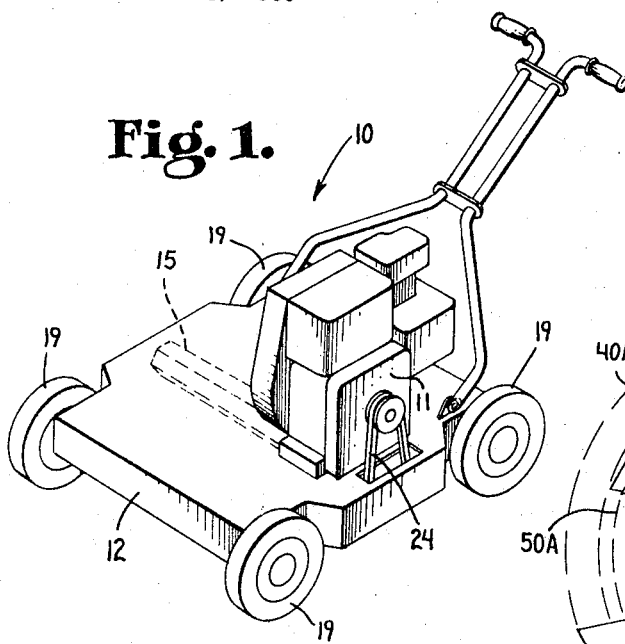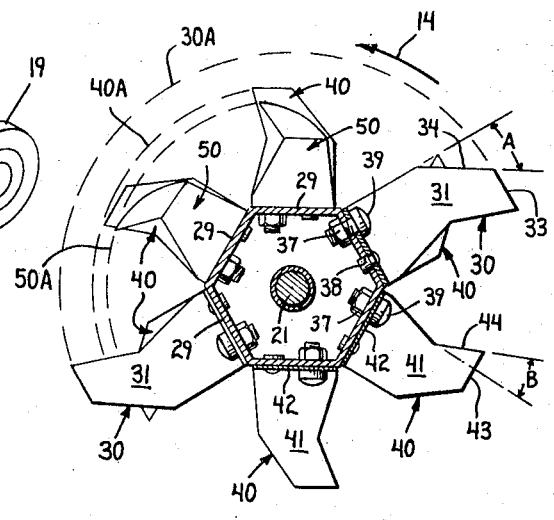

United States Patent Office 3,452,823
Patented July 1, 1969

3,452,823
LAWN CARE APPARATUS
Earl P. Shapland, Jr., Box 365, Fisher, Ill. 61843
Filed June 21, 1965, Ser. No. 465,332
Int. Cl. A01b 33/02, 15/16
U.S. Cl. 172—42                                    10 Claims

ABSTRACT OF THE DISCLOSURE

Lawn care apparatus including a tube or rod of hexagonal cross section mounted on a wheeled vehicle for powered rotation with the axis of the tube or rod in parallel relation to the ground. On the external flat surfaces of the tube or rod are mounted radially extending ground scarifying and thatch cutting blades of different lengths as well as lawn mowing blades which extend at approximately a forty-five degree angle to the radial direction.

---

The present invention relates to a lawn care apparatus and more particularly to an apparatus for cultivation and cleaning of the upper and lower root zones of grass plants.

Various devices have been conceived in the past for cutting, cultivating and raking of lawns. These devices have never been fully satisfactory. Mowing of lawns with conventional lawn mowing devices leaves clippings which settle to the upper root zone or base of the plants. Annual grass plants which grow each year from seed, die in the fall and leave the material of their plant both in the upper root zone or base of the plant and in the lower root zone adjacent to or in the surface of the soil. Perennial grass plants in the process of their growth are constantly adding new leaf structure and new root structure while at the same time old leaves and old roots are dying and remain in the upper and lower root zone. The more desirable grasses are the more vigorous grasses; and the more vigorous a grass variety, the more frequently this process goes on.

The past few years has seen the introduction of several varieties of grass such as Merion Kentucky Blue Grass, Zoysia, and several varieties of Bermuda which are many times more vigorous than common varieties, and, when adequately fertilized and kept free from diseases, go through the cycle of new plant growth many times during a growing season. These grasses are coming into wider use because they offer a deeper green, thicker, and richer looking lawn. The vigor of these grass varieties increases many times the normal thatch or build up of dead plant matter in the upper and lower root zone of the grass plant. This thatch is detrimental to the growth of the lawn. It forms in effect a seal over the top of the root zone and prevents applied fertilizer, water, sunlight and any natural or applied overseeding from reaching the root zone of the plants. Also this thatch build-up area is a natural harbor for insects and lawn fungus which result in browning of lawn areas. No presently available device is capable of satisfactorily cutting through and removing this thatch without substantially damaging the grass plants and damaging the lawn appearance.

Consequently, a primary object of the present invention is to provide a lawn care apparatus incorporating an improved means for removal of thatch or dead plant growth from both the upper and lower plant root zones.

Another object of this invention is to provide lawn care apparatus capable of making slices or grooves into the soil below existing grass plants to provide a lodging place for natural and applied seed without doing noticeable damage to existing grass plants.

Still another object of the invention is to provide a lawn care apparatus which will slice through a mat of live or dead runners of horizontal growing grass plants.

A further object of the invention is to provide improved lawn care apparatus.

Related objects and advantages will become apparent as the description proceeds.

One specific embodiment of the present invention might include a support element having an axis, means for mounting said support element for rotation about its axis with its axis in parallel relation to the ground, power means for rotating said support element in a direction of rotation, which might be opposite to the direction of travel or with the direction of travel, a means for moving said support element over the ground, a plurality of blades each mounted on said support element and formed of a relatively rigid material so as not to yield under the cutting load, said blades extending generally radially of said axis and inclined at their distal ends.

The full nature of the invention will be understood from the accompanying drawings and the following description and claims.

FIG. 1 is a perspective view of a lawn care apparatus embodying the present invention.

FIG. 2 is a vertical section taken through the machine of FIG. 1 perpendicular to the axis of the support structure but showing only the operating portion of the apparatus.

FIG. 3 is a vertical section taken through the machine of FIG. 1 and the structure of FIG. 2 and taken primarily through the axis of the support structure.

Figure 4:
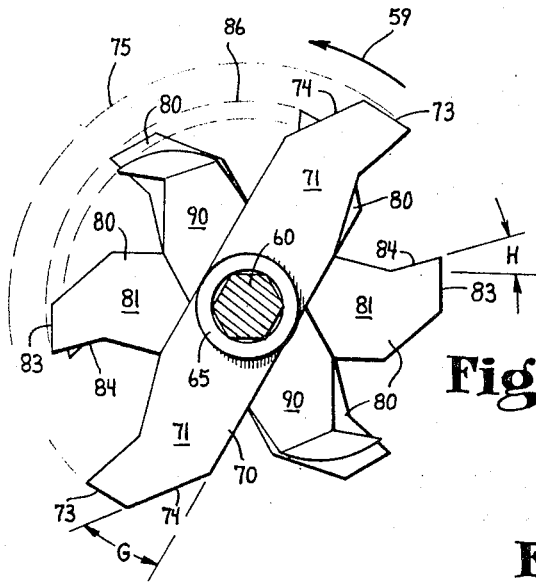
FIG. 4 is a vertical section similar to FIG. 2 of an alternative embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now particularly to the drawings, there is illustrated a lawn care apparatus 10 having a conventional motor 11 mounted on the frame 12 thereof for rotating the support structure 15. The support structure 15 is rotated in the direction indicated by arrow 14 which may be with or against the direction of travel of apparatus 10. The motor 11 can also be arranged, if desired to provide self-propulsion to the apparatus 10.

Preferably, suitable means (not shown) are provided for adjusting the distance of the support structure 15 or 16 from the ground as determined by the position of the wheels 19. This means might, for example, comprise the conventional plurality of apertures found in relatively inexpensive rotary lawn mowers or may involve a more expensive lever arrangement for vertically raising and lowering the wheels relative to the frame 12. One specific arrangement for this purpose forms a part of Model 18T, manufactured by Henderson Manufacturing Co. of Fisher, Ill. Of course, other such means for adjusting the distance of the support structure from the ground could be used.

As shown in FIG. 3, the support structure 15 is mounted for rotation about its axis with its axis in parallel relation to the ground. Thus as shown in FIG. 3 the adapters 17 and 18, the bearings 20, the shaft 21 and nuts 22 mount the tubular support structure 15 on the frame 12 for rotation about the axis of the tubular support structure. The adapter 18 has an externally cylindrical portion 23 which projects into the tube and is welded thereto for driving the tube and rotating it about its axis. The belts 24 couple the engine 11 to the tubular support structure for rotation thereof.

Referring to FIGS. 2 and 3 there is illustrated slicing blades 30, each of which has a vertically extending cutting portion 31 and a horizontally extending flange 32 used for mounting the respective blade on the tubular support structure 15. As suggested in FIG. 2, the distal ends 33 of the blades 30 all travel in the same arc 30A which may be located so that the blades move into the ground approximately one-eighth of an inch. Thus, assuming the wheels 19 contact the ground, the distance D is one-eighth of an inch. Of course, this distance will vary depending upon the thickness of the turf and adjustment of the lawn care apparatus. Also in some situations the device may be adjusted so that blades 30 do not touch the ground.

The leading edge 34 of the distal end 33 of the slicing blade is relatively sharp and is cut to a back rake angle A to promote slicing rather than lifting and tearing. The blades 30 function to cut into the ground and to provide grooves or slices to act as a lodging place for grass seed and to break the crust of the ground to permit better penetration of applied fertilizer and water. Closely spaced blades can tear and lift the turf, therefore, the blades 30 are provided only at relatively widely spaced intervals along the length of the support structure 15 as illustrated in FIG. 3 which at the lower portion thereof shows the path of the blades 30 as well as the path of other blades.

As is best shown in FIG. 2, the tubular support structure 15 has a cross section which is internally and externally hexagonal. Thus, on the external surface of the tube 15 there are provided six flat elongated mounting surfaces or platforms 29 extending parallel to the axis of the tube 15. Each of these platforms has a number of spaced Rivnuts or threaded fasteners 37 fixedly mounted in it as well as a number of holes 38 adjacent the Rivnut 37 at equal center to center distances. The horizontally extending flange 32 of each blade 30 has a hole 36 for mounting screw 39 and a cylindrical protuberance 35 for engaging hole 38 in the mounting platform. When each blade 30 is mounted, the screw 39 retains the blade against the tubular support structure and the cylindrical protuberance 35 engaged in hole 38 keys the blade to the mounting platform to insure the alignment of the blade 30 with its proper slicing path.

Also in FIGS. 2 and 3 there is illustrated thatch removal blades 40, each of which has two (in the illustrated embodiment) vertically extending portions 41 and a horizontally extending web 42 used for mounting the respective blade to the mounting platforms 29 of the tubular support structure 15. As suggested in FIG. 2, the distal ends 43 of the thatch removal blades 40 all travel in the same arc 40A which is located inside and coaxial with the arc of travel of the slicing blades 30. This path would normally be above the ground (by distance E assuming the wheels 19 contact the ground). Of course, this distance will vary depending on the thickness of the turf and adjustment of the lawn care apparatus and in some cases will penetrate the ground. The leading edge 44 of the distal end 43 of the thatch removal blade is cut to a forward rake angle B to promote lifting of the thatch from the turf as it is cut and torn loose. The blades 40 function to cut and tear loose the thatch and lift it out of the turf and deposit it into a conventional catcher if installed on the lawn care apparatus or deposit it on top of the turf for subsequent easy removal if the lawn care apparatus is not equipped with a catching device.

Figure 6:
FIG. 6 is a perspective view of a blade of the embodiment of FIGS. 2 and 3.

The thatch removal blade 40 is equipped with a pierced hole identical to 36 (FIG. 6) and cylindrical protuberance identical to 35 for mounting to the mounting platforms 29 of the tubular support structure 15 in a manner identical to the mounting described for slicing blade 30.

As is shown in FIGS. 2 and 3, lawn mowing blades 50 may be installed on the support structure 15 either together with thatch removal blades 40 and/or slicing blades 30 or with only additional lawn mowing blades. One possible way of using the present device, however, would be with the slicing blades 30 at relatively widely spaced intervals and the thatch removal blades filling in the intervals. The lawn mowing blade 50 is of the style and design covered by Letters Patent 2,923,117 to Scott W. Henderson.

As suggested in FIG. 2, the distal ends of the lawn moving blades 50 all travel in the same arc 50A which is located inside and coaxial with the arc of travel of the thatch removal blades 40 and the slicing blades 30. This path would be above the ground distance F (assuming the wheels 19 contact the ground) and distance F would be adjustable by means of the above described adjustment of the lawn care apparatus.

Various patterns of cutting paths may be established for various combinations of blades by means of changing the spacing of Rivnuts 37 and holes 38.

Figure 5:
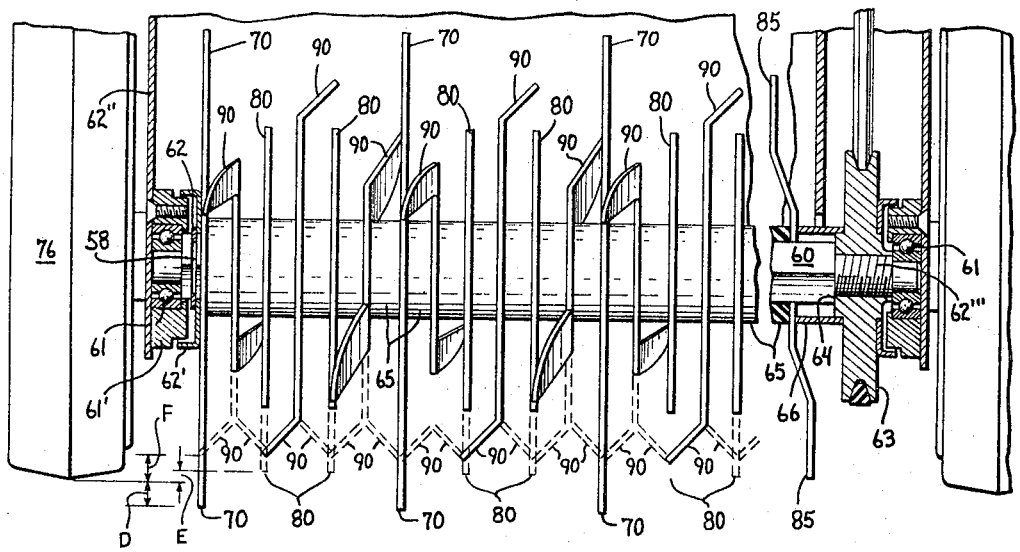
FIG. 5 is a vertical section similar to FIG. 3 of the embodiment of FIG. 4.
Figure 7:
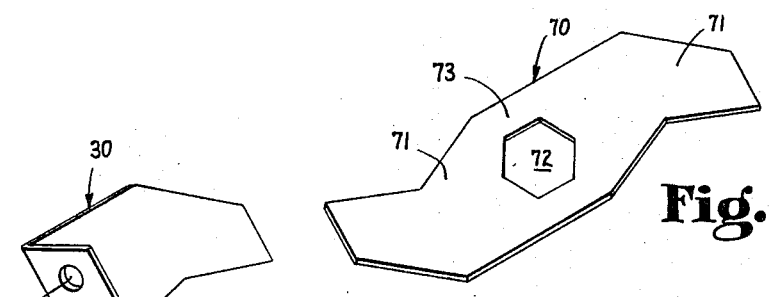
FIG. 7 is a perspective view of a blade of the embodiment of FIGS. 4 and 5.

FIGURES 4, 5 and 7 illustrate an alternative embodiment of the present invention which is identical to the apparatus of FIGS. 1–3 except as described hereinbelow. The device of FIGS. 4, 5 and 7 utilizes a hexagonal shaft 60 for a support element. As shown in FIG. 5, the support element 60 is mounted for rotation about its axis with its axis in parallel relation to the ground. Bearings 61 mount the shaft 60 within adapter 61' secured to the frame 62" for rotation about the axis of shaft 60 in the direction indicated by arrow 59 of FIG. 4 which may be with or against the direction of travel of the lawn care device. The shaft 60 has an annular recess 58 which receives a collar or ring 62 therein. The ring 62 acts as a shoulder or abutment surface and engages the spacer or cover member 62'. The opposite end 62''' of the member 60 has threads to receive the threads of the combination nut and driving pulley 63.

The threads are of suitable hand (right or left) to provide that the driving torque is always driving the pulley onto the shaft and against the shoulder 64 on member 60 thus locking the driving pulley 63 to the shaft 60. The blades 70, 80 and 90 are separated by resilient spacers 65. Received on the pulley is an annular member 66 which engages the last blade 85 to compress the entire assembly of blades and spacers against the cover or spacer 62'. The resilient spacers 65 serve to take up tolerances of manufacture and also to provide a resilient holding effect eliminating vibration. Blades 70 act as slicing blades and have a pair of vertical cutting portions 71 extending radially from the central portion 73. A hexagonal aperture 72 is formed in the central portion and fits around the hexagonal shaft 60 for driving the blade. As suggested in FIG. 4, the distal ends 73 of the blades 70 all travel in the same arc 75 which is located so that the blades move into the ground approximately one-eighth of an inch as indicated by distance D (assuming wheels 76 at ground level). Of course, the distance will vary depending upon the thickness of the turf and adjustment of the lawn care apparatus and in some cases the blades 70 will not touch the ground. The leading edge 74 of the distal end 73 of the slicing blade is cut to a back rake angle G to promote slicing rather than lifting and tearing. The function and performance of slicing blade 70 is identical to that of slicing blade 30.

Also in FIGS. 4 and 5 are illustrated thatch removal blades 80, each of which has a pair of vertically extending portions 81 and a hexagonal mounting aperture 72. The distal ends 83 of the thatch removal blades 80 travel in the same arc 86 which is located inside and coaxial the arc 75 of travel of the slicing blades 70. This path would normally be above the ground by distance E (assuming wheels 76 at ground level). Of course, this distance will vary depending on the thickness of the turf and adjustment of the lawn care apparatus and in some cases blades 80 will penetrate the ground. The leading edge 84 of the distal end 83 of the thatch removal blade 80 is cut to a forward rake angle H to provide lifting of the thatch from the turf as it is cut and torn loose. The function of thatch removal blade 80 is the same as the function of thatch removal blade 40 of the tubular support structure.

In FIG. 5 there is shown an alternative thatch removal blade 85 which is identical to thatch removal blade 80 except that it has its ends offset in opposite directions so that its distal ends travel through two separate circular paths. Thatch removal blade 85 will function the same as two thatch removal blades 80 reducing the number of blades required.

As is shown in FIGS. 4 and 5, lawn mowing blades 90 may be installed on the support structure 16 either together with thatch removal blades 80 and/or slicing blades 70 or with only additional lawn mowing blades. The lawn mowing blade 90 is of the style and design covered by Letters Patent 2,509,343 issued to Scott W. Henderson of Kokomo, Ind., on May 30, 1950.

As suggested in FIG. 4, the distal ends of the lawn mowing blades 90 travel in the same arc which is located inside and coaxial with the arc 86 of travel of the thatch removal blades 80 and the slicing blades 70. This path would be above the ground distance F (assuming wheels 76 at ground level) but is adjustable by the previously mentioned adjustment of the lawn care apparatus.

Various patterns of cutting paths may be established for various combinations of blades by means of using different width resilient spacers 65.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claims are also desired to be protected.

The invention claimed is:

1. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongate member rotates on its axis, all of said blades being arranged in radially extending planes, power means for continuously rotating said elongate member, a frame having said elongate member rotatably mounted thereon, wheels rotatably mounted on said frame for supporting said device on the ground, said longer blade arcs extending outboard of said wheels and said shorter blade arcs inboard of said wheels.

2. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongated member rotates on its axis, said other longer blades have forward cutting surfaces with a back rake angle and said some blades have forward cutting surfaces with a forward rake angle, all of said cutting surfaces being in planes perpendicular to said axis.

3. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongated member rotates on its axis, means for mounting said elongate member for rotation about its axis with its axis in parallel relation to the ground, and power means for rotating said support element in a direction of rotation, said some blades having forward cutting surfaces with a rake angle in the direction of rotation and said other longer blades having forward cutting surfaces with a back rake angle.

4. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongated member rotates on its axis, said securing means comprising a protuberance on each of said blades, each of said blades having an aperture therethrough spaced from said protuberance, said elongated member having an external cross section of polygonal shape providing a plurality of flat elongate platforms extending parallel to the axis of said member, each of said platforms having a plurality of pairs of holes therethrough with one hole of each pair being threaded, a plurality of screws each extending through a respective aperture and threaded into a respective one hole and securing a respective blade to said elongated member with the respective protuberance of the blade in the other hole of said respective pair, the one hole and the other hole of all of said pairs being equally spaced to permit interchangeability of the blades.

5. In a lawn care device as defined in claim 1, said blades extending on both sides of said elongate member and having a central polygonal aperture, said elongated member having a polygonal shape and extending through the apertures of the blades, and resilient annular members spacing said blades apart.

6. In a lawn care device as defined in claim 1, said member being hollow and having a cross section of polygonal shape providing a plurality of flat elongate platforms extending parallel to the axis of said member, said securing means disposing said blades and said axis at spaced intervals on said platforms.

7. A polygonal lawn care device rotor comprising a tube adapted to be rotated about its tubular axis with such axis parallel to the ground; a plurality of ground cutting blades secured on the outside of said tube at intervals along said tube as well as angularly around the axis of said tube; said ground cutting blades having forward cutting surfaces with a back rake angle; a plurality of raking blades secured on the outside of said tube at intervals along said tube as well as angularly around said tube; said raking blades having forward cutting surfaces with a rake angle in the direction of rotation; all of said blades being rigid.

8. A rotor as defined in claim 7 wherein said first-mentioned blades terminate at a distance radially outward from the axis of said tube which is slightly greater than the distance from the axis of said tube at which said second-mentioned blades terminate.

9. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongate member rotates on its axis, a portion of said some shorter blades having distal ends which are inclined at an acute angle relative to said axis for lawn mowing, the remainder of said some shorter blades and all of said other longer blades being arranged in radially extending planes, power means for continuously rotating said elongate member, a frame having said elongate member rotatably mounted thereon, wheels rotatably mounted on said frame for supporting said device on the ground, said longer blade arcs extending outboard of said wheels and said shorter blade arcs inboard of said wheels.

10. In a lawn care device: an elongate member rotatable on an axis extending lengthwise thereof; a plurality of blades; means securing said blades to and projecting from said member at spaced intervals; some of said blades being shorter than others of said blades and therefore defining arcs of lesser radii than the arcs defined by said other longer blades as said elongated member rotates on its axis, a portion of said some shorter blades having distal ends which are inclined at an acute angle relative to said axis for lawn mowing, said others of said blades and a further portion of said shorter blades have distal ends which extend perpendicularly of said axis.

References Cited

UNITED STATES PATENTS

| 1,740,321 | 12/1929 | Vasconcellos | 172—120 |
| 2,509,343 | 5/1950 | Henderson | 56—294 |
| 2,827,751 | 3/1958 | Mascaro | 56—294 X |
| 3,102,376 | 9/1963 | Henderson | 56—294 |

FOREIGN PATENTS

| 27,779 | 6/1931 | Australia. |
| 389,023 | 8/1908 | France. |

ANTONIO F. GUIDA, *Primary Examiner.*

STEPHEN C. PELLEGRINO, *Assistant Examiner.*

U.S. Cl. X.R.

56—294; 172—548